US008698808B2

(12) United States Patent
Kilgard

(10) Patent No.: US 8,698,808 B2
(45) Date of Patent: Apr. 15, 2014

(54) CONVERSION OF DASHED STROKES INTO QUADRATIC BÈZIER SEGMENT SEQUENCES

(75) Inventor: Mark J. Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 173 days.

(21) Appl. No.: 13/098,147

(22) Filed: Apr. 29, 2011

(65) Prior Publication Data

US 2011/0285723 A1 Nov. 24, 2011

Related U.S. Application Data

(60) Provisional application No. 61/347,359, filed on May 21, 2010.

(51) Int. Cl.
*G06T 11/20* (2006.01)

(52) U.S. Cl.
USPC .......................................... 345/442; 345/443

(58) Field of Classification Search
None
See application file for complete search history.

(56) References Cited

U.S. PATENT DOCUMENTS

| 5,731,820 | A | * | 3/1998 | Broekhuijsen ................ 345/442 |
| 5,774,133 | A | | 6/1998 | Neave et al. |
| 5,818,459 | A | * | 10/1998 | Kurumida ..................... 345/442 |
| 6,137,500 | A | * | 10/2000 | Silverbrook et al. ......... 345/442 |
| 6,384,822 | B1 | | 5/2002 | Bilodeau et al. |
| 6,819,332 | B2 | | 11/2004 | Baldwin |
| 7,167,181 | B2 | | 1/2007 | Duluk et al. |
| 7,184,040 | B1 | | 2/2007 | Tzvetkov |
| 7,355,602 | B1 | | 4/2008 | Kilgard et al. |
| 7,403,208 | B1 | | 7/2008 | Bastos et al. |
| 7,499,055 | B2 | | 3/2009 | Lin et al. |
| 7,589,730 | B1 | * | 9/2009 | Brown .......................... 345/442 |
| 7,684,641 | B1 | | 3/2010 | Toksvig |
| 7,737,983 | B2 | | 6/2010 | Brothers et al. |
| 7,847,798 | B1 | | 12/2010 | Parenteau et al. |
| 7,868,887 | B1 | | 1/2011 | Yhann |
| 7,872,648 | B2 | | 1/2011 | Hoppe et al. |
| 7,928,984 | B1 | | 4/2011 | Yhann et al. |
| 8,044,955 | B1 | | 10/2011 | Yhann |
| 8,044,956 | B1 | | 10/2011 | Kilgard |

(Continued)

FOREIGN PATENT DOCUMENTS

GB 2463993 A * 4/2010

OTHER PUBLICATIONS

Blinn, Jim. "Jim Blinn's Corner Notation, Notation, Notation". 2003, Elsevier Inc. Chapter 16, p. 219-229.*

(Continued)

*Primary Examiner* — Kee M Tung
*Assistant Examiner* — Nicholas R Wilson
(74) *Attorney, Agent, or Firm* — Patterson + Sheridan, LLP

(57) ABSTRACT

One embodiment of the present invention sets forth a technique for converting dashed strokes into quadratic Bèzier segment sequences. Path rendering with stroking and dashing may be accelerated when a graphics processing unit or other processor is configured to subdivide quadratic Bèzier segments based on the remaining distance for a current dash pattern element and the arc length of the current quadratic Bèzier path segment to generate "on" dash pattern segments. Each "on" dash pattern segment is then bounded by a conservative geometric hull. A point containment technique is then used to identify pixels within each conservative geometric hull that are within half of the stroke width of any point along a path to be stroked.

20 Claims, 14 Drawing Sheets

(56) References Cited

U.S. PATENT DOCUMENTS

| | | |
|---|---|---|
| 8,063,914 B1 | 11/2011 | Miller et al. |
| 8,264,503 B1 | 9/2012 | Parenteau et al. |
| 8,379,025 B1 | 2/2013 | Carr et al. |
| 2002/0194436 A1 | 12/2002 | McKenney |
| 2003/0164842 A1 | 9/2003 | Oberoi et al. |
| 2004/0233195 A1 | 11/2004 | Bunnell |
| 2007/0109318 A1 | 5/2007 | Tuomi |
| 2007/0211061 A1 | 9/2007 | Kokojima |
| 2008/0122866 A1 | 5/2008 | Dorbie et al. |
| 2008/0198168 A1 | 8/2008 | Jiao et al. |
| 2010/0002003 A1 | 1/2010 | Yamauchi |
| 2010/0097382 A1 | 4/2010 | Nystad et al. |
| 2010/0097388 A1 | 4/2010 | Nystad et al. |
| 2010/0110093 A1 | 5/2010 | Nystad et al. |
| 2010/0149181 A1 | 6/2010 | Lee et al. |
| 2010/0185949 A1 | 7/2010 | Jaeger |
| 2010/0225660 A1 | 9/2010 | Robart |
| 2011/0090228 A1 | 4/2011 | Persson |

OTHER PUBLICATIONS

Stone, Maureen c., DeRose, Tony D. "A Geometric Characterization of Parametric Cubic Curves". ACM Transactions on Graphics, vol. 8, No. 3, Jul. 1989, p. 147-163.*

Farouki, et al. "Algebraic properties of plane offset curves", Elsevier Science Publishers B.V. (North-Holland) 1990, pp. 101-127.

Warnock, et al. "A Device Independent Graphics Imaging Model for Use with Raster Devices", Computer Graphics vol. 16, No. 3, Jul. 1982, pp. 313-319.

Loop, et al. "Resolution Independent Curve Rendering using Programmable Graphics Hardware", Association for Computing Machinery, Inc., 2005, pp. 1000-1009.

Kokojima, et al. "Resolution Independent Rendering of Deformable Vector Objects using Graphics Hardware", Toshiba Corp. (email: yoshiyuki.kokojima@toshiba.co.jp), one page.

Rueda, et al. "GPU-based rendering of curved polygons using simplicial coverings" Elsevier Computers & Graphics Journal 32, 2008 pp. 581-588.

Non-Final Office Action for U.S. Appl. No. 13/097,483 dated Jun. 14, 2013.

Benstead, Luke, et al., Beginning OpenGL Game Programming, Second Edition, Mar. 13, 2009, Course Technology PTR, pp. 245-249.

Non-Final Office Action for U.S. Appl. No. 13/097,993 dated May 30, 2013.

Nehab, Diego, and Hugues Hoppe. "Random-access rendering of general vector graphics." ACM Transactions on Graphics (TOG). vol. 27. No. 5, ACM, 2008.

Wikipedia, Blend Modes.

Non-Final Office Action for U.S. Appl. No. 13/109,763 dated Mar. 4, 2013.

Final Office Action for U.S. Appl. No. 13/109,763 dated Jun. 14, 2013.

Advisory Action for U.S. Appl. No. 13/109,763 dated Aug. 26, 2013.

Non-Final Office Action for U.S. Appl. No. 13/111,897 dated Jul. 29, 2013.

Non-Final Office Action for U.S. Appl. No. 13/110,777 dated May 14, 2013.

Non-Final Office Action for U.S. Appl. No. 13/111,148 dated Jun. 4, 2013.

Non-Final Office Action for U.S. Appl. No. 13/112,874 dated Apr. 8, 2013.

Final Office Action for U.S. Appl. No. 13/112,874 dated Aug. 1, 2013.

Advisory Action for U.S. Appl. No. 13/112,874 dated Oct. 10, 2013.

* cited by examiner

PRIOR ART

Dashed Stroked
Line Segments
With Square
End Caps
500

Dashed Stroked
Line Segments
With Triangular
End Caps
501

Dashed Stroked
Line Segments
With Round
End Caps
502

Dashed Cubic Bezier Segment in a Loop with Round End Caps
580

Hull Geometry
585

Hull Geometry for Round End Caps
587

CONVERSION OF DASHED STROKES INTO QUADRATIC BÈZIER SEGMENT SEQUENCES

CROSS-REFERENCE TO RELATED APPLICATIONS

This application claims priority benefit to United States provisional patent application titled, "Path Rendering," filed on May 21, 2010 and having Ser. No. 61/347,359. This related application is also hereby incorporated by reference in its entirety.

BACKGROUND OF THE INVENTION

1. Field of the Invention

The present invention generally relates to graphics processing and more specifically to converting dashed strokes into quadratic Bèzier segment sequences.

2. Description of the Related Art

Path rendering is a style of resolution-independent two-dimensional (2D) rendering, often called "vector graphics," that is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more.

Path rendering is resolution-independent meaning that a scene is described by paths without regard to the pixel resolution of the framebuffer. This is in contrast to the resolution-dependent nature of so-called bitmapped graphics. Whereas bitmapped images exhibit blurred or pixilated appearance when zoomed or otherwise transformed, scenes specified with path rendering can be rendered at different resolutions or otherwise transformed without blurring the boundaries of filled or stroked paths.

Sometimes the term vector graphics is used to mean path rendering, but path rendering is a more specific approach to computer graphics. While vector graphics could be any computer graphics approach that represents objects (typically 2D) in a resolution-independent way, path rendering is a much more specific rendering model with salient features that include path filling, path stroking, dashing, path masking, compositing, and path segments specified as Bèzier curves.

FIG. 1A is a prior art scene composed of a sequence of paths. In path rendering, a 2D picture or scene such as that shown in FIG. 1A is specified as a sequence of paths. Each path is specified by a sequence of path commands and a corresponding set of scalar coordinates. Path rendering is analogous to how an artist draws with pens and brushes. A path is a collection of sub-paths. Each sub-path (also called a trajectory) is a connected sequence of line segments and/or curved segments. Each sub-path may be closed, meaning the sub-path's start and terminal points are the same location so the stroke forms a loop; alternatively, a sub-path can be open, meaning the sub-path's start and terminal points are distinct.

When rendering a particular path, the path may be filled, stroked, or both. As shown in FIG. 1A, the paths constituting the scene are stroked. When a path is both filled and stroked, typically the stroking operation is done immediately subsequent to the filling operation so the stroking outlines the filled region. Artists tend to use stroking and filling together in this way to help highlight or offset the filled region so typically the stroking is done with a different color than the filling.

FIG. 1B is the sequence of paths shown in FIG. 1A with only filling. Filling is the process of coloring or painting the set of pixels "inside" the closed sub-paths of a path. Filling is similar to the way a child would "color in between the lines" of a coloring book. If a sub-path within a path is not closed when such a sub-path is filled, the standard practice is to force the sub-path closed by connecting its end and start points with an implicit line segment, thereby closing the sub-path, and then filling that resulting closed path.

While the meaning of "inside a path" generally matches the intuitive meaning of this phrase, path rendering formalizes this notion with what is called a fill-rule. The intuitive sense of "inside" is sufficient as long as a closed sub-path does not self-intersect itself. However if a sub-path intersects itself or another sub-path or some sub-paths are fully contained within other sub-paths, what it means to be inside or outside the path needs to be better specified.

Stroking is distinct from filling and is more analogous to tracing or outlining each sub-path in a path as if with a pen or marker. Stroking operates on the perimeter or boundary defined by the path whereas filling operates on the path's interior. Unlike filling, there is no requirement for the sub-paths within a path to be closed for stroking. For example, the curve of a letter "S" could be stroked without having to be closed though the curve of the letter "O" could also be stroked.

FIG. 1C is a prior art scene composed of the sequence of paths from FIG. 1A with the stroking from FIG. 1A and the filling from FIG. 1B. FIG. 1C shows how filling and stroking are typically combined in a path rendering scene for a complete the scene. Both stroking and filling are integral to the scene's appearance.

Traditionally, graphics processing units (GPUs) have included features to accelerate 2D bitmapped graphics and three-dimensional (3D) graphics. In today's systems, nearly all path rendering is performed by a central processing unit (CPU) performing scan-line rendering with no acceleration by a GPU. GPUs do not directly render curved primitives, so path rendering primitives such as Bèzier segments and partial elliptical arcs must be approximated by lots of tiny triangles when a GPU is used to render the paths. Constructing the required tessellations of a path that is approximated by many short connected line segments can create a substantial CPU burden. The triangles or other polygons resulting from tessellation are then rendered by the GPU. Because GPUs are so fast at rasterizing triangles, tessellating paths into polygons that can then be rendered by GPUs is an obvious approach to GPU-accelerating path rendering.

Tessellation is a fragile, often quite sequential, process that requires global inspection of the entire path. Tessellation depends on dynamic data structures to sort, search, and otherwise juggle the incremental steps involved in generating a tessellation. Path rendering makes this process considerably harder by permitting curved path segments as well as allowing path segments to self-intersect, form high genus topologies, and be unbounded in size.

A general problem with using a GPU to render paths is unacceptably poor antialiasing quality when compared to standard CPU-based methods. The problem is that GPUs rely on point sampling for rasterization of triangular primitives with only 1 to 8 samples (often 4) per pixel. CPU-based scan-line methods typically rely on 16 or more samples per pixel and can accumulate coverage over horizontal spans.

Animating or editing paths is costly because it requires re-tessellating the entire path since the tessellation is resolution dependent, and in general it is very difficult to prove a local edit to a path will not cause a global change in the tessellation of the path. Furthermore, when curved path segments are present and the scaling of the path with respect to pixel space changes appreciably (zooming in say), the curved path segments may need to be re-subdivided and re-tessellation is likely to be necessary.

Additionally, compositing in path rendering systems typically requires that pixels rasterized by a filled or stroked path are updated once-and-only-once per rasterization of the path. This requirement means non-overlapping tessellations are required. So for example, a cross cannot be tessellated as two overlapping rectangles but rather must be rendered by the outline of the cross, introducing additional vertices and primitives. In particular, this means the sub-paths of a path cannot be processed separately without first determining that no two sub-paths overlap. These requirements, combined with the generally fragile and sequential nature of tessellation algorithms make path tessellation particularly expensive. Because of the expense required in generating tessellations, it is very tempting and pragmatic to cache tessellations. Unfortunately such tessellations are much less compact than the original path representations, particularly when curved path segments are involved. Consequently, a greater amount of data must be stored to cache paths after tessellation compared with storing the paths prior to tessellation. Cached tessellations are also ineffective when paths are animated or rendered just once.

Conventional stroking has been performed by approximating paths into sub-pixel linear segments and then tracing the segments with a circle having a diameter equal to a stroke width. Offset curves are generated at the boundary of the stroked path. These offset curves are typically of much higher degree of complexity compared with the linear segments that are traced to generate the stroked path. Determining whether or not each pixel is inside or outside of a stroked path to generate the stroking is mathematically complex. Identification of the pixels to be stroked is equivalent to identifying pixels that are within half of the stroke width of any point along the path to be stroked. More specifically, the pixels to be stroked are within half of the stroke width measured along a line that is perpendicular to the tangent of the path segment being stroked.

The tangent of a sub-path is not necessarily well-defined at junctions between path segments. So additional rules are needed to determine what happens at and in the vicinity of such junctions as well as what happens at the terminal (start and end) points of sub-paths. Therefore stroking specifies further stroking rules to handle these situations.

In standard path rendering systems, paths are specified as a sequence of cubic and quadratic (non-rational) Bèzier curve segments, partial elliptical arcs, and line segments. While more mathematically complex path segments representations could be used to specify paths, in practice, existing standards limit themselves to the aforementioned path segment types.

Path filling and stroking use the same underlying path specification. For filling, this means the resulting piece-wise boundaries to be filled may be up to third-order (in the case of cubic Bèzier segments) or rational second-order (in the case of partial elliptical arcs). Filling these curved boundaries of Bèzier curves and arcs is clearly harder than filling the standard polygonal primitives in conventional polygonal 2D or 3D rendering where the boundaries (edges) of the polygonal primitives (usually triangles) are all first-order, being linear segments, and often required to be convex. Filling (and stroking) are also harder than conventional line and convex polygon rasterization because paths are unbounded in their complexity whereas line segments and triangles are defined by just 2 or 3 points respectively. A path may contain just a single path segment or it could contain thousands or more.

The boundaries of stroked paths are actually substantially higher order than the third-order segments. The offset curve of non-rational (second-order) quadratic and (third-order) Bèzier curves are eighth- and tenth-order curves respectively. This high order makes exact determination and evaluation of the resulting offset curves for such Bèzier segments intractable for use in direct rendering. In other words, it is quite unreasonable to try to determine exactly the boundary representation of such offset curves and then simply fill them. For this reason, various techniques have been developed to approximate offset curves with sequences of Bèzier, arc, or line segments. These approximate stroke boundaries may then be filled.

The strokes may be embellished using dashing that interrupts the stroke with gaps that are specified by a repeated pattern of on-off lengths, called a dash pattern. The dash pattern for a particular path may begin at an initial offset into the dash pattern other than zero; this offset is known as the dash offset. The dash offset essentially shifts the dash pattern up or down (if negative) the path. Dashing is common in technical illustration. Dashing is helpful in distinguishing different types of lines or connections. Artists also make use of dashing to accomplish various artistic effects. For example, a necklace of beads can be rendered as a set of very short dashes with round end caps.

FIG. 1D illustrates a prior art image including dashed stroked paths and dashed elliptical arcs 200 of generating paths on the top edge of each cake layer. The dashed elliptical arcs 200 have round end caps for a "beaded" look and the flowers on the cake layer sides are produced by dashed stroked paths 205. FIG. 1E illustrates the prior art image of FIG. 1D without the dashed stroked paths 205 and dashed elliptical arcs 200.

Dashing curved paths is difficult because it requires the computation of incremental arc lengths along a dashed path. Computing the length of a cubic Bèzier segment or partial elliptical arc lacks a tractable closed form solution and is therefore extremely difficult. Closed form analytic equations for the arc lengths of cubic Bèzier segments and arcs limited to elementary functions do not exist.

Accordingly, what is needed in the art is an improved system and method for rendering stroked paths that are dashed.

SUMMARY OF THE INVENTION

One embodiment of the present invention sets forth a technique converting dashed strokes into quadratic Bèzier segment sequences. Path rendering with stroking and dashing may be accelerated when a graphics processing unit or other processor is configured to subdivide quadratic Bèzier segments based on a dash pattern. Each subdivided quadratic Bèzier segment is then bounded by a conservative geometric hull. A point containment technique is then used identify pixels within each conservative geometric hull that are within half of the stroke width of any point along a path to be stroked.

Various embodiments of a method of the invention for generating dashed stroked quadratic Bèzier path segments include receiving a quadratic Bèzier path segment and a dash pattern, computing a remaining distance for a current dash pattern element of the dash pattern, and computing an arc length of the quadratic Bèzier path segment. The quadratic Bèzier path segment is subdivided based on the remaining distance for the current dash pattern element and the arc length of the quadratic Bèzier path segment to generate "on" dash pattern segments of the quadratic Bèzier path segment.

Because the quadratic Bèzier path segments used to produce the stroked path are resolution-independent, the dashed stroked path can be rasterized under arbitrary projective transformations without needing to revisit the construction of the quadratic Bèzier path segments. This resolution-independent property is unlike geometry sets built through a process of tessellating curved regions into triangles; in such circumstances, sufficient magnification of the stroked path would reveal the tessellated underlying nature of such a tessellated geometry set. The quadratic Bèzier segments are also compact meaning that the number of bytes required to represent the stroked path is linear with the number of quadratic Bèzier path segments in the original path. This property does not generally hold for tessellated versions of stroked paths where the process of subdividing curved edges and introducing tessellated triangles typically increases the size of the resulting geometry set considerably.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
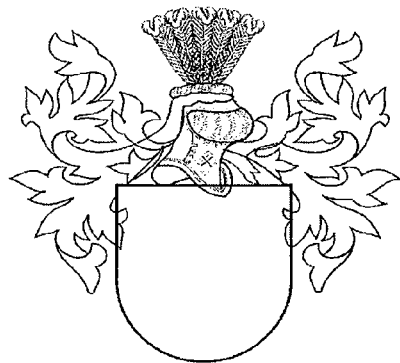
FIG. 1A is a prior art scene composed of a sequence of paths.
Figure 1B:
FIG. 1B is the fill for the prior art scene shown in FIG. 1A.
Figure 1C:
FIG. 1C is the prior art scene of FIG. 1A with the fill of FIG. 1B and the stroked sequence of paths.
Figure 1D:
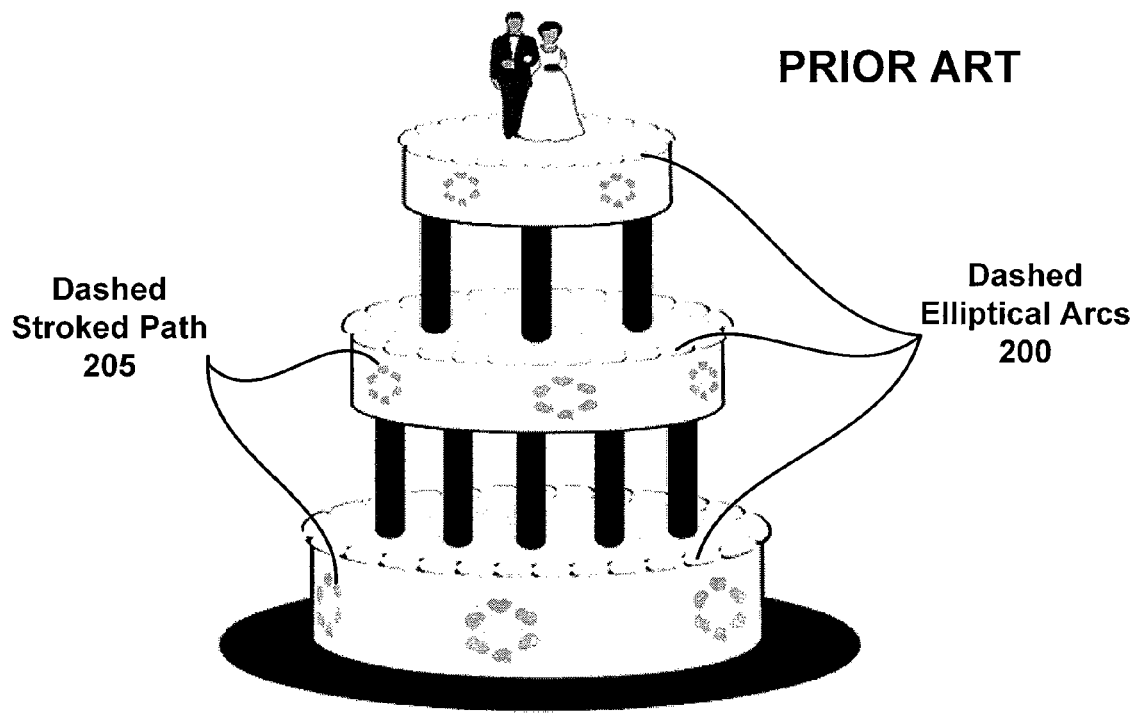
FIG. 1D illustrates a prior art image including dashed stroked paths and dashed elliptical arcs of generating paths.
Figure 1E:
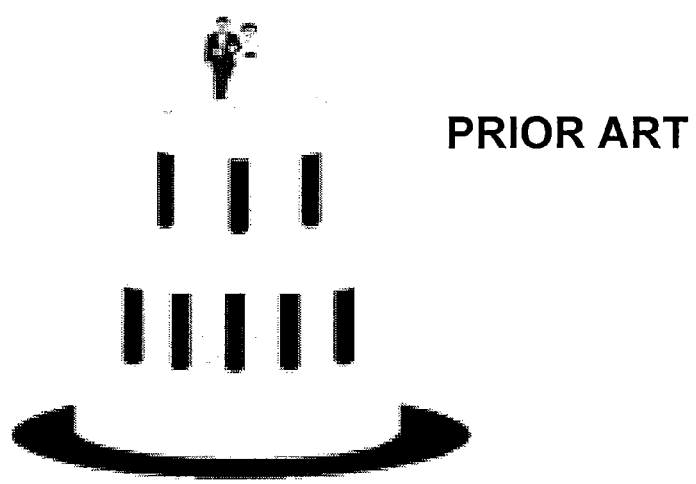
FIG. 1E illustrates the prior art image of FIG. 1D without the dashed stroked paths and dashed elliptical arcs.
Figure 2A:
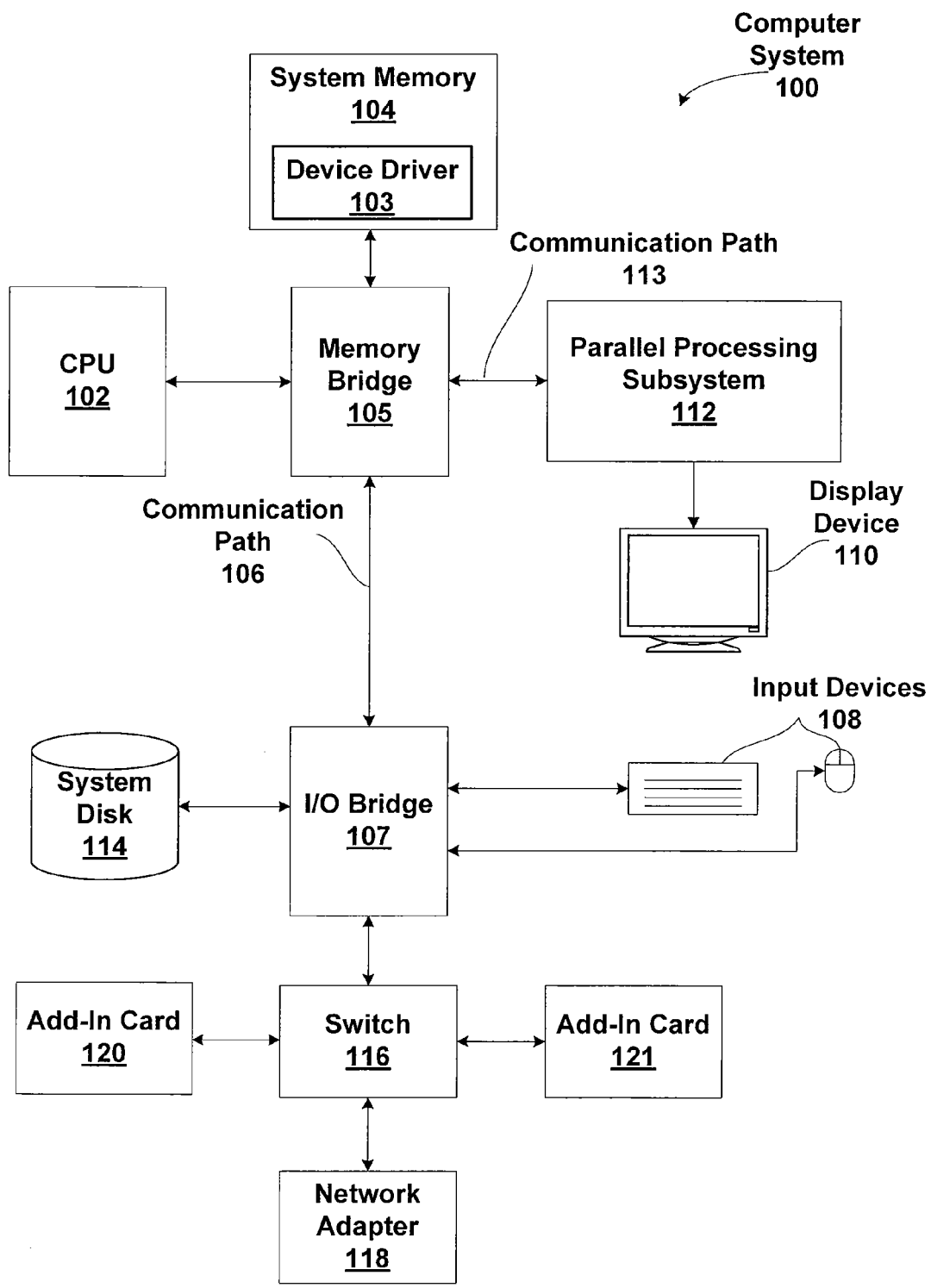
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
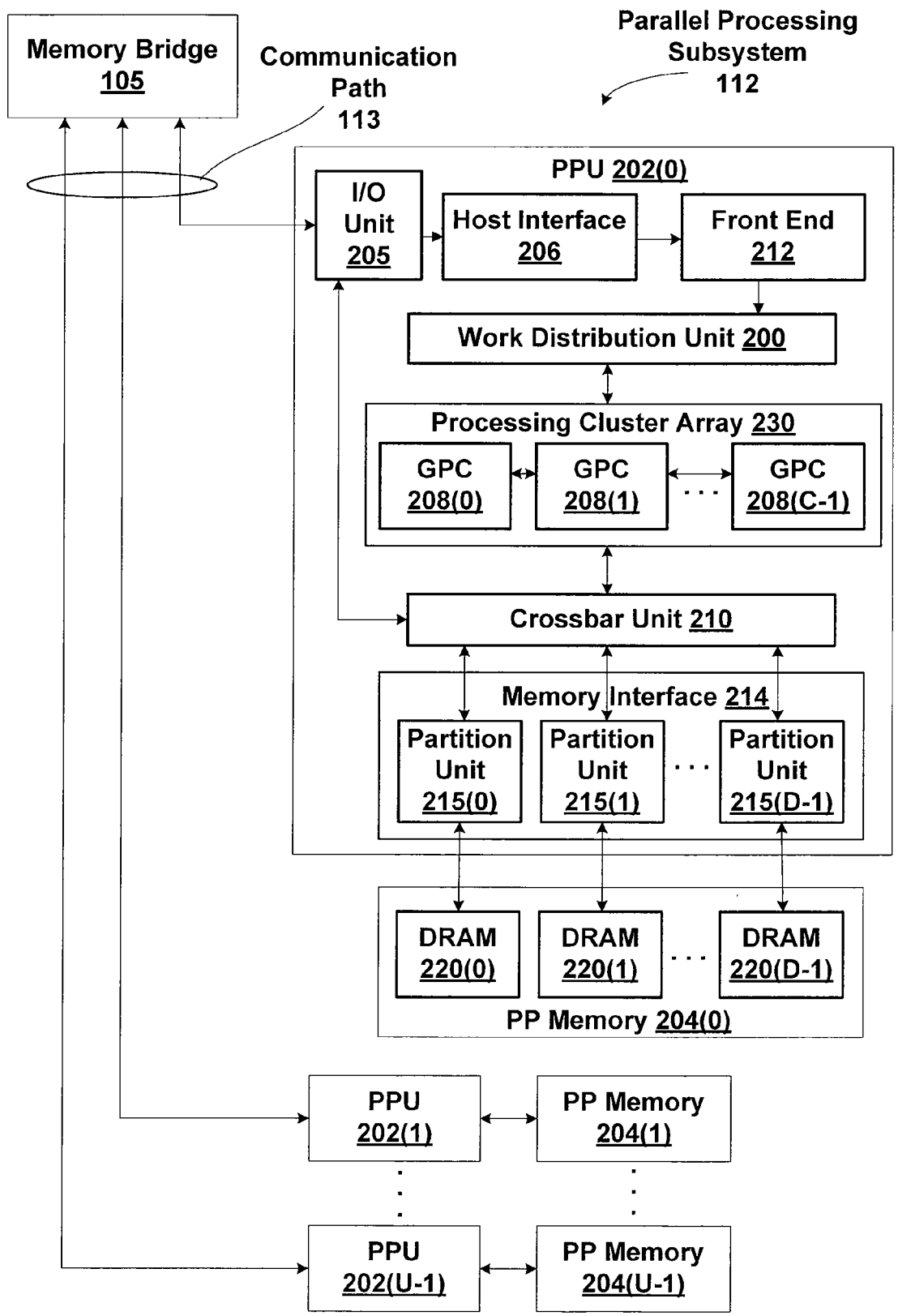
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
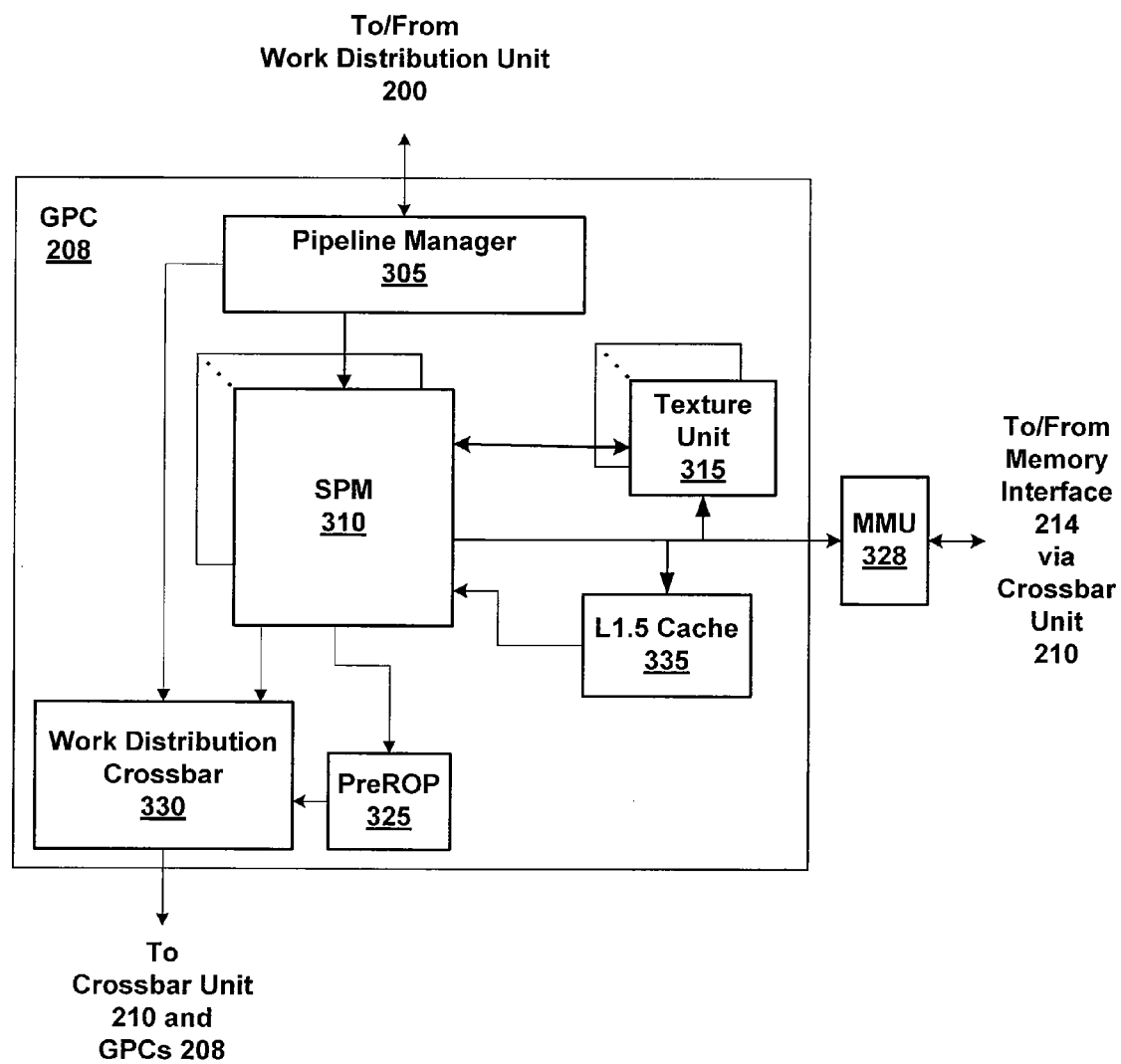
FIG. 3A is a block diagram of a GPC within one of the PPUs of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
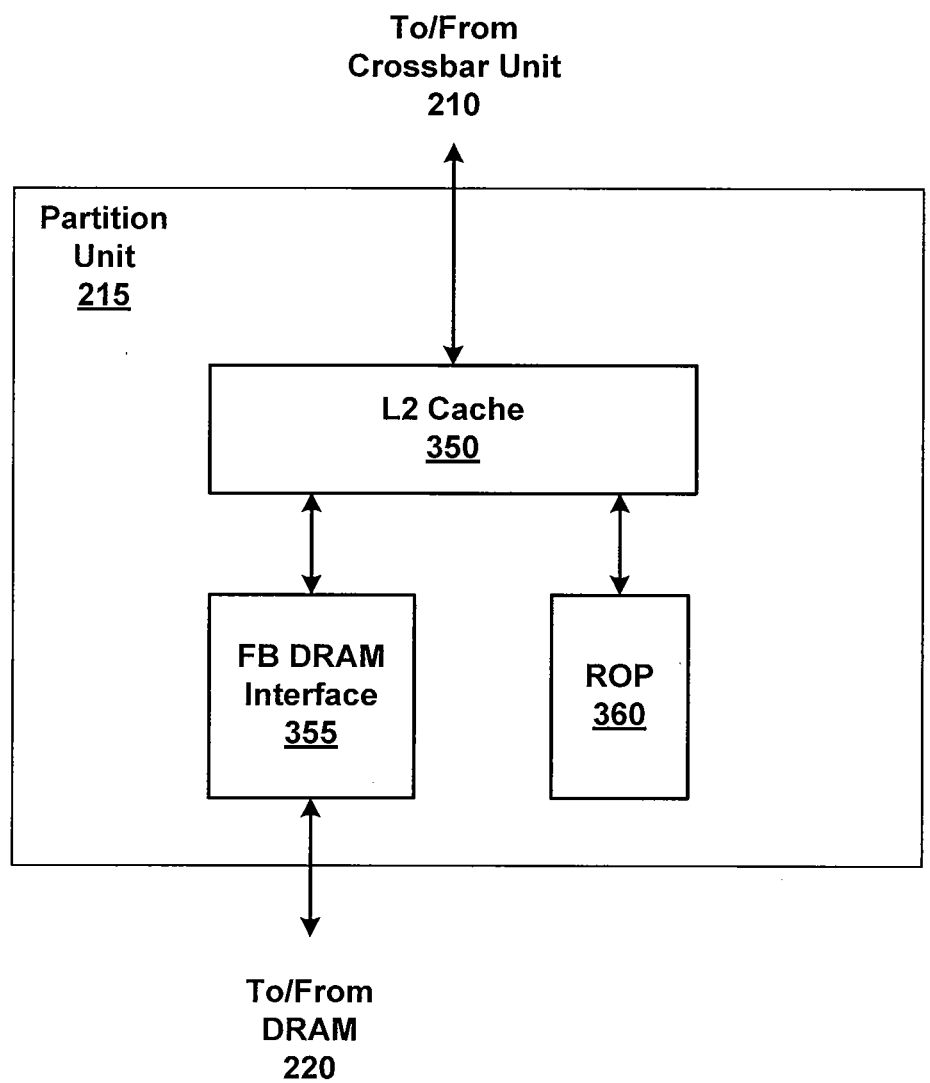
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
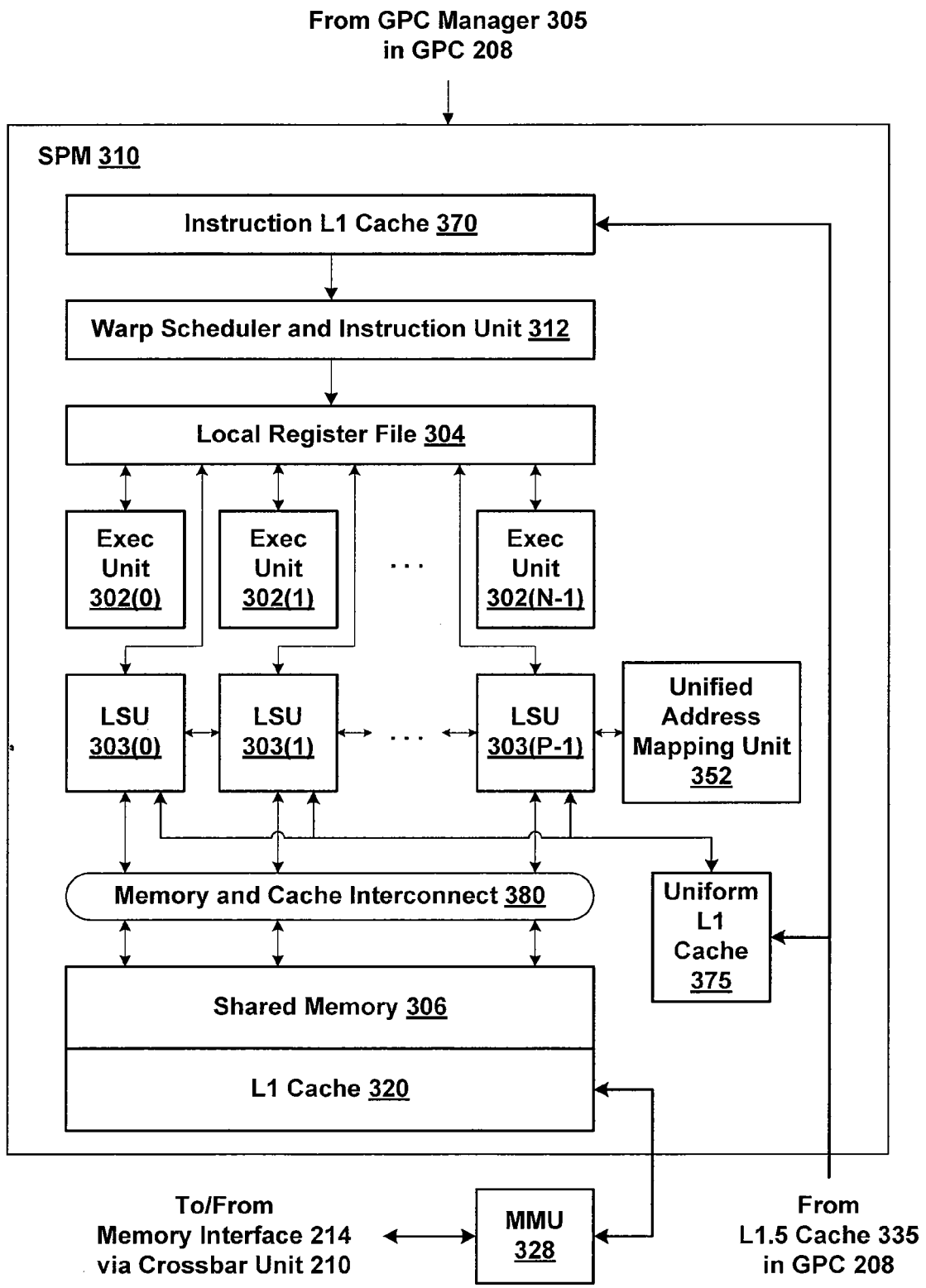
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CIA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
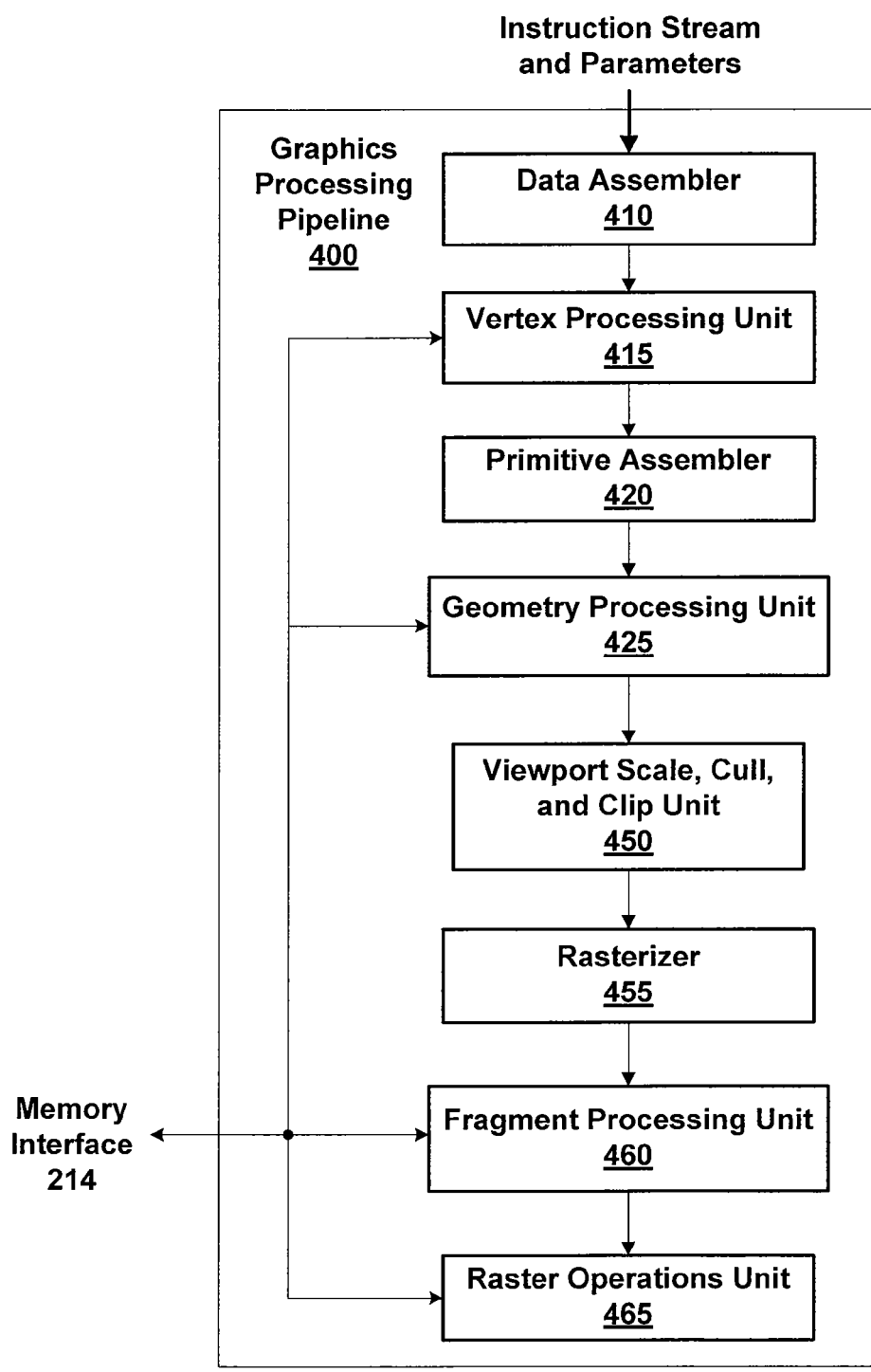
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Dashing Stroked Paths

Path stroking has an associated "stroke width" that defines the region that is included in the stroke when a circle having a diameter of the stroke width is moved along the path segment. When path stroking is performed, the path segment is considered a generating curve and a circle having a diameter equal to the stroke width generates an inside offset curve and an outside offset curve as the circle moves along the path segment. Mathematical computation of the inside and the outside offset curves is difficult.

In one embodiment, a GPU, such as the PPU 202, may be used to perform functions to accelerate stroking operations. Importantly, tessellation of the path segments is avoided. Instead, a path is decomposed into quadratic Bèzier path segments or segments of lower complexity, e.g., arcs, line segments, and the like. Path decomposition results in fewer approximations and a more compact and resolution-independent representation from which to render stroked paths compared with tessellation of the path.

Decomposing a path into quadratic Bèzier segments produces a geometry set that is suitable for stroking rendered paths containing higher-order Bèzier segments, such as cubic Bèzier segments, without tessellating the path into polygons. The path is divided into quadratic Bèzier path segments, arcs, and/or line segments. A technique for decomposing a path into quadratic Bèzier segments is described in patent application Ser. No. 13/098,102 filed Apr. 29, 2011, and titled "Approximation of Stroked Higher-Order Curved Segments by Quadratic Bèzier Curve Segments." The quadratic Bèzier path segments, arcs, and line segments generated by the decomposition technique are then processed to determine whether or not points are contained within the stroke region of each quadratic Bèzier path segment, arc, or line segment.

Point containment may be performed by direct evaluation on quadratic Bèzier path segments to identify points that are within the stroke region. Consider a quadratic Bèzier segment Q with its 3 control points $C_0$, $C_1$, and $C_2$. Point containment with respect to the stroke of Q asks whether a point P is within the region swept by a line segment of length $2r$ centered along Q and sweeping so it is always perpendicular to the tangent of Q. The length $2r$ is the stroke width; half that distance r is known as the stroke radius. By generating hull geometry that conservatively bounds the stroke region for quadratic Bèzier path segments, the expense of direct evaluation is limited to the immediate polygonal vicinity of the quadratic Bèzier segment's stroke region. Additionally, the parallel computation possible in a Processing Cluster Array 230 makes direct evaluation practical. Importantly, equations defining the actual bounding curves of the stroke region are not computed or evaluated to stroke the quadratic Bèzier path segments. A technique for stroking a path including quadratic Bèzier segments is described in patent application Ser. No. 13/097,993 filed Apr. 29, 2011, and titled "Point Containment for Quadratic Bèzier Strokes."

Bèzier curves are defined by their control points. In the 2D content of path rendering, each control point is a 2D position. Curved path segments for a path may be generated by path commands for quadratic Bèzier curves, cubic Bèzier curves, and partial elliptical arcs.

A quadratic Bèzier curve is specified by 3 control points and a cubic Bèzier curve is specified by 4 control points. The QUADRATICTO command uses the terminal position of the prior command as its initial control point (x0,y0) and then 4 associated coordinates form the two new (x1,y1) and (x2,y2) control points. The quadratic Bèzier curve starts at (x0,y0) heading towards (x1,y1) and ends at (x2,y2) as if coming from (x1,y1). Despite (x1,y1) providing the initial tangent direction when starting from (x0,y0) and terminating at (x2, y2), the resulting curve does not pass through (x1,y1); for this reason, (x1,y1) is known as an extrapolating control point while (x0,y0) and (x2,y2) are known as interpolating control points.

The CUBICTO command is similar to the QUADRATICTO command but generates a cubic Bèzier curve. Such a curve is specified by 4 control points. The CUBICTO command uses the terminal position of the prior command as its initial control point (x0,y0) and then 6 associated coordinates form the 3 new (x1,y1), (x2,y2), and (x3,y3) control points. The cubic Bèzier curve starts at (x0,y0) heading towards (x1,y1) and ends at (x3,y3) as if coming from (x2,y2). While a quadratic Bèzier curve has a single extrapolating control point, cubic Bèzier curves have two extrapolating control points, (x1,y1) and (x2,y2). A cubic Bèzier curve has the freedom, unlike a quadratic Bèzier curve, to specify arbitrary initial and terminal tangent directions for its end-points. This control makes cubic Bèzier curves popular with artists. This additional control comes from the curve being described by a third-order univariate polynomial equation instead of a second-order equation in the case of a quadratic Bèzier curve (and first-order in the case of line segments).

Cubic Bèzier paths that are decomposed into quadratic Bèzier path segments, arcs, and line segments are then processed to determine whether or not points are contained within the stroke region of each quadratic Bèzier path segment, arc, or line segment and dashing is performed.

Dashing is a standard embellishment to stroking whereby the stroke is dividing up into multiple sub-strokes based on an on-off pattern known as the dash pattern of the stroke. Path rendering standards supporting dashing include PostScript, Portable Document Format (PDF), Open XML Paper Specification (OpenXPS), SVG, and OpenVG. The dash pattern is an array of lengths specified in path-space units. For example, a dash pattern [4, 3, 2, 7] is 4 arc lengths on, 3 arc lengths off, 2 arc lengths on, 7 arc lengths off, repeated. If the dash pattern has an odd number of elements, the effective dash pattern is repeated twice to ensure the effective dash pattern always has an even number of elements.

The alternating elements of the dash pattern are arc lengths that specify how long to "dash on" and "dash off" the stroked curve; the dash pattern is initially on. When stroking a path, an additional scalar dash offset parameter indicates how many path-space units into the dash pattern the stroke begins, i.e., dash offset is an offset into the dash pattern. Another scalar dash phase parameter may also be specified that indicates if the subpaths restart at the dash offset or at a particular phase of the dash offset. A subpath is a connected set of path segments; a new subpath is initiated by a MoveTo command in the path's command sequence is encountered. Intuitively, a MOVETO command is similar to an artist picking up the pen and moving to a new 2D position on the page. So the dash phase indicates whether the dash pattern restarts for disconnected segments of a stroked path or not. An end-cap style indicates what happens at the end points of open (non-closed) sub-paths. Typical end-cap styles are round, square, none, and triangle. If the sub-path is closed, the join style is used to connect the initial and terminal segments rather than using end caps. When dashing, the ends of dashed stroked segments may have a capping style distinct from the end caps of each stroked subpath; in this case, these caps are referred to as dash caps.

Figure 5A:
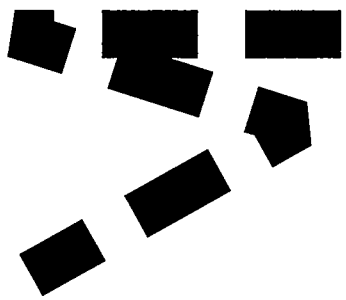
FIG. 5A illustrates a path that may be represented as a sequence of line segments, stroked, and dashed using different types of end caps, according to one embodiment of the invention.
Figure 5A:
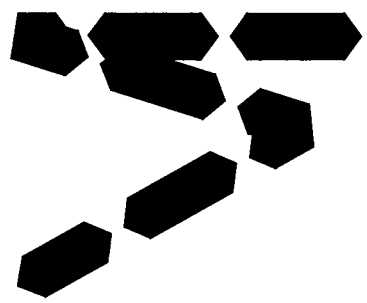
Figure 5A:
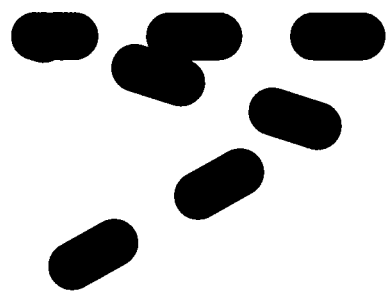

FIG. 5A illustrates a path that may be represented as a sequence of line segments, stroked, and dashed using different types of end and dash caps, according to one embodiment of the invention. A first sequence of line segments is dashed without end caps (end cap style none), dashed stroked line segments without end caps 500. A second sequence of line segments is dashed using triangular end caps, dashed stroked line segments with triangular end caps 501. A third sequence of line segments is dashed using round end caps, dashed stroked line segments with round end caps 502. For simplicity and to match typical usage, the end and dash cap styles are the same in FIG. 5A.

The first, second, and third sequences of line segments includes three line segments. When dashing spans path segments, the dashing algorithm must be careful to provide proper join styles at path segment junctions. Additionally, when a sub-path is not closed, end-caps must be added to the initial and terminal ends of the sub-path, as shown in the first, second, and third sequences of line segments of FIG. 5A.

Dashing straight line segments may be performed easily since the path-space units are aligned with the line segments. However, dashing curved path segments requires computing the partial arc lengths of the curved path segments, and is therefore more difficult. More specifically, cubic Bèzier segments and partial elliptical arcs are well-known to not have arc lengths expressible in a closed-form analytical form involving relatively elementary functions, e.g., log, exp, sin, and the like, as cubic Bèzier segments and partial elliptical arcs require elliptic integrals to express their arc lengths. In contrast with cubic Bèzier segments and partial elliptical arcs, quadratic Bèzier segments do have closed form solutions, as will be explained. Therefore, decomposing higher-order curve segments into quadratic Bèzier segments and other lower-order curve segments enables dashing of stroked paths that have been decomposed.

For stroking, any quadratic Bèzier segment that degenerates to, or nearly degenerates to, one or more line segments is reduced to such linear segments. This reduction is similarly useful for dashing because dashing such degenerate quadratic Bèzier segments is fraught with numerical issues whereas line segments are handled cleanly.

Figure 5B:
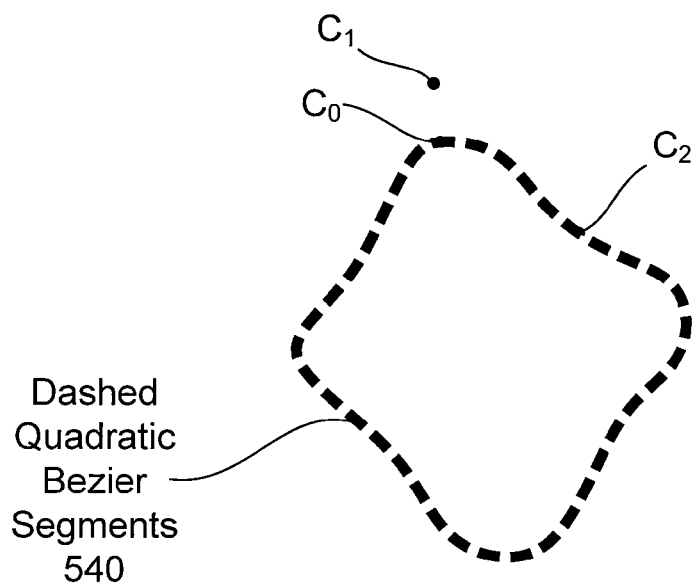
FIG. 5B illustrates a closed path containing four quadratic Bèzier segments that are stroked and dashed, according to one embodiment of the invention.

FIG. 5B illustrates a closed path containing four quadratic Bèzier segments that are stroked and dashed, according to one embodiment of the invention. The join style specified for the path is used at each boundary between the four dashed quadratic Bèzier segments 540. Control points C0, C1, and C2 define one of the four dashed quadratic Bèzier segments 540.

Figure 5C:
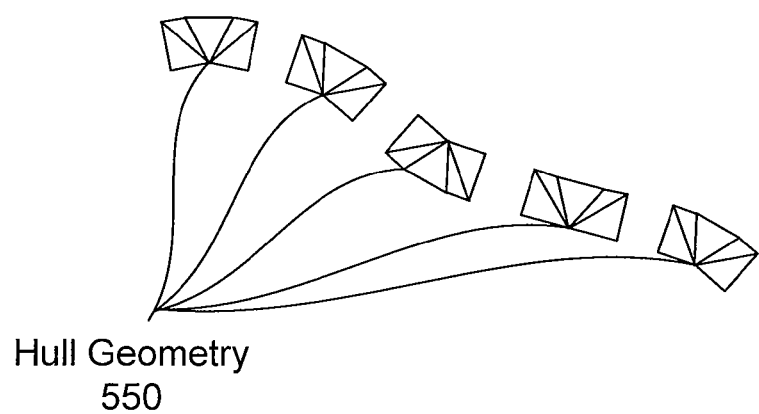
FIG. 5C illustrates a portion of the quadratic Bèzier segment stroke bounding hull geometry for the closed path containing four quadratic Bèzier segments of FIG. 5B, according to one embodiment of the invention.

For each quadratic Bèzier path segment (including ones generated by approximating other curve segments), a stroking engine generates a conservative hull polygon that completely encloses a stroke region of the quadratic Bèzier path segment. FIG. 5C illustrates a portion of the quadratic Bèzier segment stroke bounding hull geometry 550 for the closed path containing four quadratic Bèzier segments of FIG. 5B, according to one embodiment of the invention. The bounding hull geometry 550 conservatively encloses each dash of the stroked path that is on. Notice how the quadratic Bèzier stroke geometric hulls adapt appropriately to the curvature present in the quadratic Bèzier path segment from which the hull geometry instances are generated.

In addition to the bounding hull geometry 550, the stroking engine also collects or generates a set of polygonal geometry for any square or triangular dash-caps and end-caps or mitered or beveled join styles. The stroking engine also collects or generates a set of polygonal geometry for rounded stroking with associated texture coordinates to generate round dash-caps and end-caps, join styles, and hemi-circles for cusps of curved segments converted to line segments. This geometry may include texture coordinates indicating vertex position relative to the junction, end-point, or cusp.

Figure 5D:
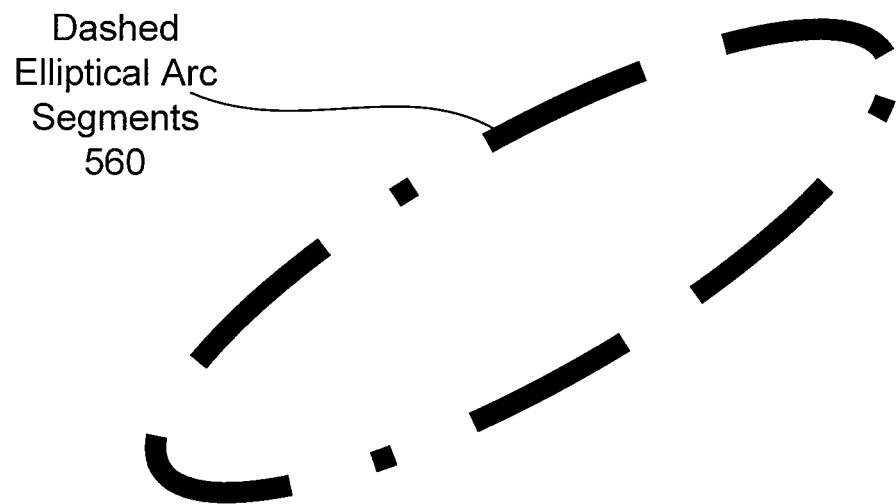
FIG. 5D illustrates a closed path containing two half-ellipse, elliptical arc segments that are stroked and dashed, according to one embodiment of the invention.
Figure 5E:
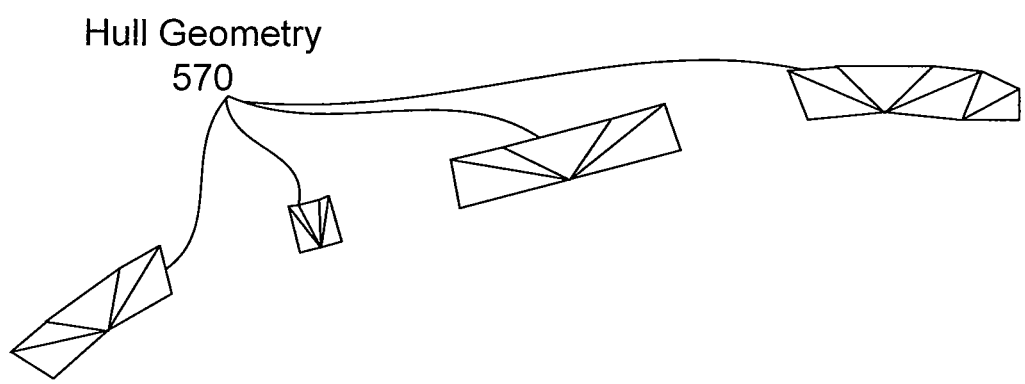
FIG. 5E illustrates a portion of the quadratic Bèzier segment stroke bounding hull geometry for the closed path containing the four two half-ellipse, elliptical arc segments of FIG. 5D, according to one embodiment of the invention.

FIG. 5D illustrates a closed path containing two half-ellipse, elliptical arc segments that are stroked and dashed, according to one embodiment of the invention. Control points and other elliptical arc parameters (not shown) define the dashed elliptical arc segments 560. The dashing decomposition to quadratic Bèzier stroke segments performs the decomposition based on the generating path segment's partial elliptical arc. FIG. 5E illustrates a portion of the dashed quadratic Bèzier segment stroke bounding hull geometry 570 for the closed path containing the two half-ellipse, elliptical arc segments of FIG. 5D, according to one embodiment of the invention.

Figure 5F:
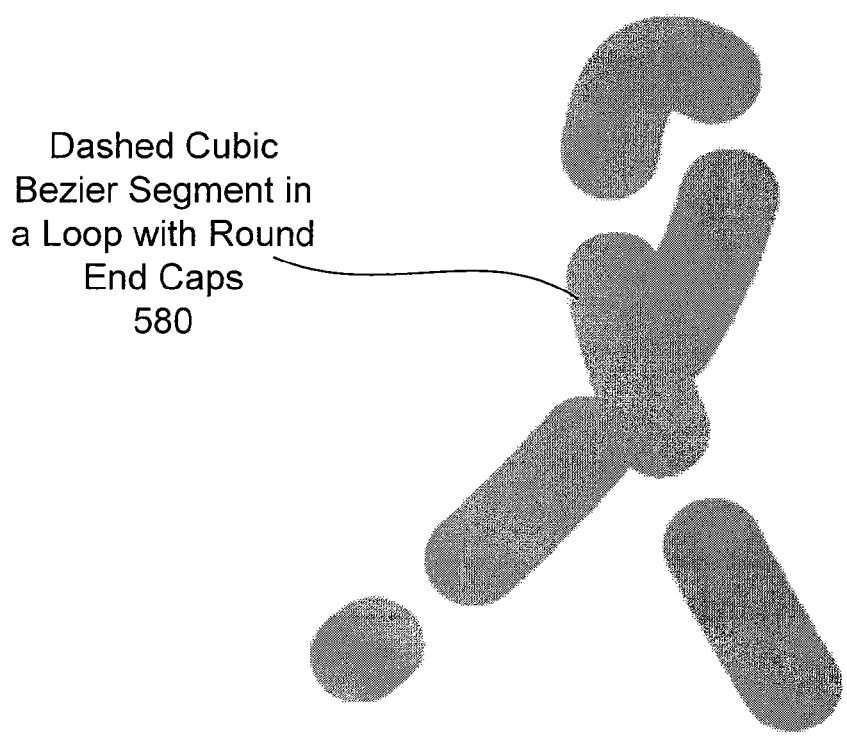
FIG. 5F illustrates a dashed stroked cubic Bèzier segment forming a loop, according to one embodiment of the invention.
Figure 5G:
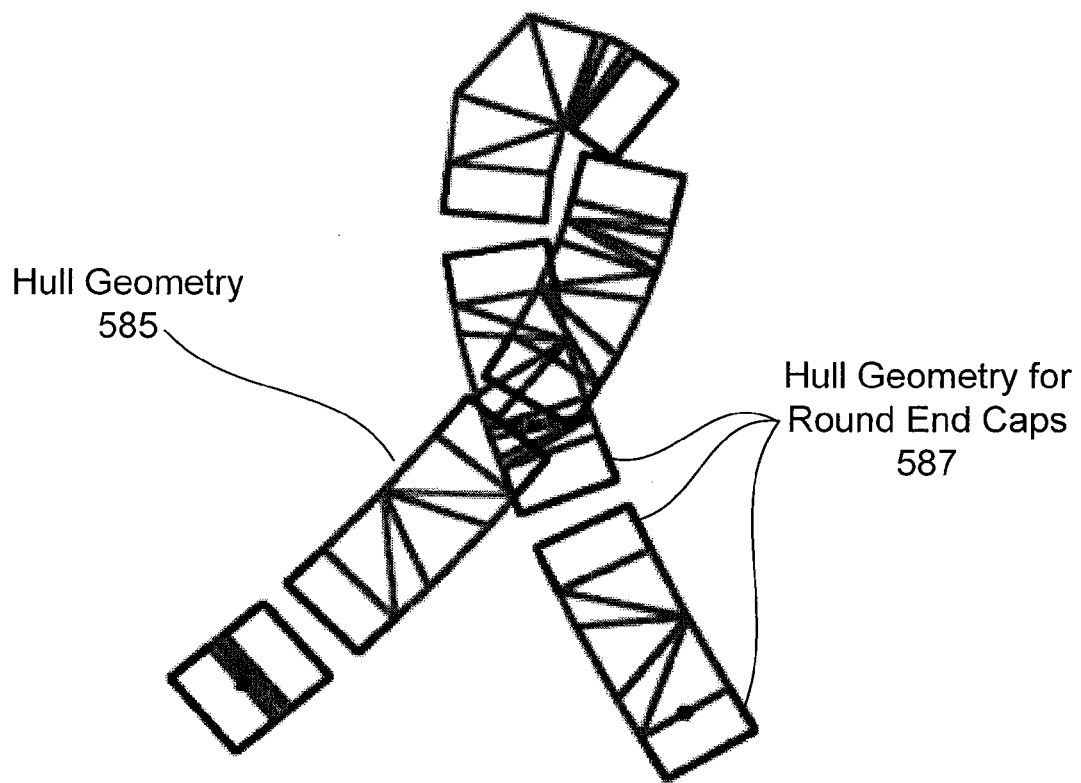
FIG. 5G illustrates a portion of the dashed approximating quadratic Bèzier segment bounding hull geometry for the loop path of FIG. 5E, according to one embodiment of the invention.

FIG. 5F illustrates a dashed stroked cubic Bèzier segment forming a loop, according to one embodiment of the invention. Control points (not shown) define the dashed cubic Bèzier segment in a loop with round end caps 580. The cubic Bèzier segment is decomposed into approximating quadratic Bèzier segments and conservative bounding hull geometry is generated. FIG. 5G illustrates a portion of the dashed approximating quadratic Bèzier segment bounding hull geometry 585 for the loop path of FIG. 5E, according to one embodiment of the invention. The hull geometry 585 includes conservative bounding hull geometry for round end caps 587. In one embodiment, a discard fragment shader (distinct from the quadratic Bèzier stroke discard shader used for hull geometry 585) executes at each pixel location within the hull geometry for round end caps 587 to discard locations not within the hemi-circle of the round end caps.

As previously described, dashing of a quadratic Bèzier segment requires computation of the arc length of the quadratic Bèzier segment. Consider again the quadratic Bèzier segment Q with 3 control points $P_0$, $P_1$, and $P_2$. A point P is contained within the region swept by a line segment of length $2r$ centered along Q and sweeping so it is always perpendicular to the tangent of Q.

The parametric function Q(t) representing Q is $$Q(t) = At^2 + Bt + C \quad \text{(Equation 1)}$$

Where vector intermediates A, B, and C are:

$$A = P_0 - 2P_1 + P_2$$

$$B = 2(P_1 - P_0)$$

$$C = P_0 \quad \text{(Equation 2)}$$

Derivatives Q(t) in terms of t are:

$$\frac{dQ_x}{dt} = -2(1-t)_{0x} - 2tP_{1x} + 2(1-t)P_{1x} + 2tP_{2x} \quad \text{(Equation 3)}$$

$$\frac{dQ_x}{dt} = 2A_x t + B_x$$

$$\frac{dQ_y}{dt} = -2(1-t)P_{0y} - 2tP_{1y} + 2(1-t)P_{1y} + 2tP_{2y}$$

$$\frac{dQ_y}{dt} = 2A_y t + B$$

By definition, the arc length over the segment's parametric range [0,1] is:

$$Q_{arclen} = \int_0^1 \sqrt{\left(\frac{dQ_x}{dt}\right)^2 + \left(\frac{dQ_y}{dt}\right)^2}\, dt \quad \text{(Equation 4)}$$

Notice that the $dQ_x^2 + dQ_y^2$ is a quadratic polynomial:

$$\begin{aligned}
&((2p_{0x} - 4p_{1x} + 2p_{2x})^2 + (2p_{0y} - 4p_{1y} + 2p_{2y})^2) \\
&\quad t^2 + + (2(-2p_{0x} + 2p_{1x})(2p_{0x} - 4p_{1x} + 2p_{2x}) + \\
&\quad 2(-2p_{0y} + 2p_{1y})(2p_{0y} - 4p_{1y} + 2p_{2y}))t + \\
&\quad (-2p_{0x} + 2p_{1x})^2 + (-2p_{0y} + 2p_{1y})^2
\end{aligned}$$

This can be rewritten in the form a canonical quadratic polynomial shown in Equation 1

$$c*t^2 + b*t + a$$

where a, b and c are scalar intermediates. In Equations 1 and 2, A, B, C are 2-component vector coefficients and a, b, c are scalar coefficients. A B, C and a, b, c are two distinct sets of variances (though they both share being quadratic equation coefficients).

$$a = (-2p_{0x} + 2p_{1x})^2 + (-2p_{0y} + 2p_{1y})^2$$

$$b = 2(-2p_{0x} + 2p_{1x})(2p_{0x} - 4p_{1x} + 2p_{2x}) + 2(-2p_{0y} + 2p_{1y})(2p_{0y} - 4p_{1y} + 2p_{2y})$$

$$c = (2p_{0x} - 4p_{1x} + 2p_{2x})^2 + (2p_{0y} - 4p_{1y} + 2p_{2y})^2$$

Notice the following geometric interpretations of a, b, and c in terms of the vector coefficients from Equations 1 and 2:

$$a = \text{dot}(B, B)$$

$$b = 2*\text{dot}(B, C)$$

$$c = \text{dot}(C, C)$$

where B is $2*(P_1 - P_0)$, or twice the vector from $P_0$ to $P_1$; and where C is $2*((P_0 - P_1) + (P_2 - P_1))$ or $2*(P_0 - 2*P_1 + P_2)$, or twice the vector from $P_1$ to $P_0$ concatenated with the vector from $P_1$ to $P_2$. Assume the quadratic is not a degenerate line or point, a and c must be positive. This assumption is safe because if the quadratic Bèzier segment is degenerate, the method converts the segment into a line segment or point.

Once the $dQx^2 + dQy^2$ expression in the arc length integral is known to be a general quadratic polynomial, the arc length can be determined by substituting in the general quadratic $c*t^2 + b*t + a$ in Equation 5 below:

$$Q_{arclen} = \frac{(b^2 - 4ca) - 2\left((2c+b)\sqrt{c(c+a+b)} - \sqrt{ac}\right) \ln\left(\frac{b + 2\sqrt{ac}}{2(c + \sqrt{c(c+a+b)}) + b}\right)}{8c^{3/2}}$$

In order to catch anomalies of floating-point evaluation that can arise with very short arc lengths, this arc length should compared to the chord length between $C_0$ and $C_2$ as a sanity check. If the chord length is the smaller distance compared with the computed arc length, then the chord length should be used.

The arc length computation may be coded in C++ (assuming double2 is a 2-component vector data type with double-precision components) as shown by the example code in TABLE 1.

TABLE 1

```
const double2   &P0 = points [0],
                &P1 = points [1],
                &P2 = points [2];
const double2   C = 2* (P0-2*P1+P2),
                B = 2* (P1-P0);
const double    a = dot(B,B),
                b = 2*dot(B,C),
                c = dot(C,C),
                sqrt_c = sqrt(c),
                sqrt_c_b_a = sqrt(c+b+a),
                sqrt_a = sqrt(a),
                denom = 8*sqrt_c*c,
                log_numer = 2*c+b+2*sqrt_c_b_a*sqrt_c,
                log_denom = b+2*sqrt_a* sqrt_c,
                log_result = log(log_numer/log_denom),
                numer = (4.0*c*a − b*b) *log_result
                    − 2*sqrt_c* (b*sqrt_a− (2*c+b) *sqrt_c_b_a),
                arclen01 = numer / denom;
```

This direct approach of computing the arc length of quadratic Bèzier segments is in contrast to conventional techniques. One conventional technique uses a recursive subdivision process to bound the arc length of Bèzier curves and depends on using Euclidean distance computations to bound the arc length error. Another conventional technique approximates the arc length of curves with subdivision into approximating partial circular arcs. By evaluating the arc length of quadratic Bèzier segments from a closed form analytic equation such as Equation 5, the expense of recursive subdivision used by the conventional technique is avoided. Indeed for quadratic Bèzier curves, the arc length computation shown in equation 5 is algebraically exact.

The dashing process requires not simply determining the arc length of a quadratic Bèzier segment of a path, but also determining where within a curved quadratic Bèzier segment the residual arc length for the current dash element is exhausted. Using the closed form analytic equation of the quadratic Bèzier arc length, the bisection method can quickly determine where the dashing residual is exhausted in a given segment's parametric interval. Also when quadratic Bèzier segments are shorter than the current dash pattern element, evaluating the quadratic Bèzier segment arc length in a single analytic evaluation is faster than recursive subdivision schemes to determine arc length.

Figure 6A:
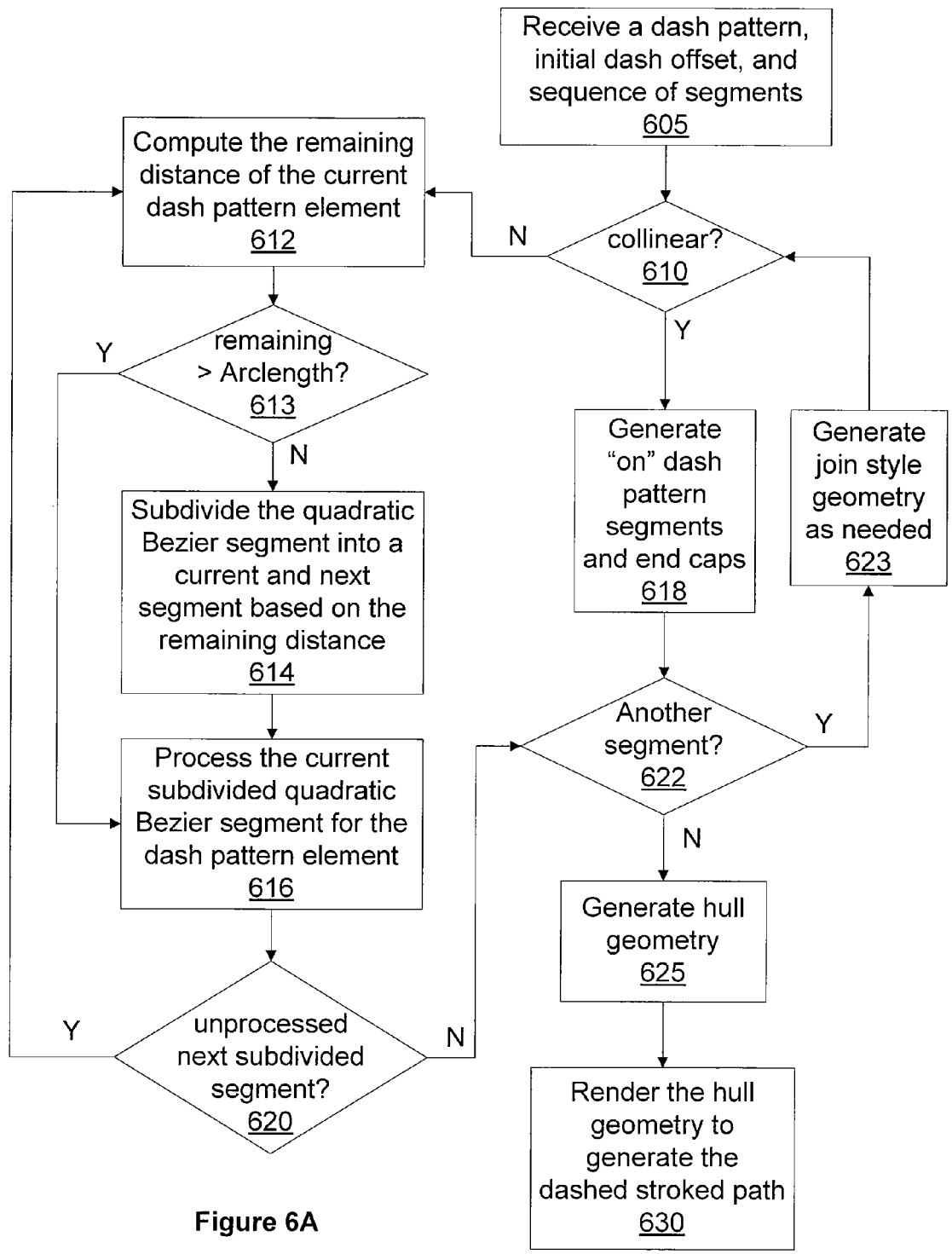
FIG. 6A is a flow diagram of method steps for dashing a stroked path including quadratic Bèzier segments, according to one embodiment of the present invention.

FIG. 6A is a flow diagram of method steps for dashing a stroked path including quadratic Bèzier segments, according to one embodiment of the present invention. Although the method steps are described in conjunction with the systems of FIGS. 2A, 2B, 3A, 3B, 3C, and 4, persons skilled in the art will understand that any system configured to perform the method steps, in any order, is within the scope of the inventions. The CPU 102 or parallel processing subsystem 112 may be configured to dash a stroked path into a collection of quadratic Bèzier path segments, line segments, and arcs.

At step 605 a path, stroke width, dash pattern, initial dash offset, and end cap type is received by a path stroke engine and is pre-processed by decomposing higher-order curved segments into a sequence of quadratic Bèzier segments, converting degenerate quadratic Bèzier segments to line segments, converting line segments to rectangles, and generating end caps and joint styles, all with the goal of isolating the non-degenerate quadratic Bèzier segments. The engine determines based on the dash pattern and initial dash offset if the Boolean dashing state is initially "on" or "off". The path decomposition engine may be embodied as an application program or driver for execution by CPU 102 and/or parallel processing subsystem 112 or as circuitry configured to perform the method steps shown in FIG. 6A. A path decomposition engine decomposes cubic Bèzier curves and any higher order curves into an approximating sequence of quadratic Bèzier path segments and lower order path segments. The path decomposition engine determines if each path segment is a degenerate line or within an epsilon of being so, and if it is, the path segment is converted to a line segment. The path decomposition engine also identifies line segments (including line segments generated by the path decomposition engine from degenerate lines) in the path and converts the identified line segments to rectangles.

The per-quadratic Bèzier path segment parameters A, B, and C are computed by the path decomposition engine using equation 2. The per-quadratic Bèzier path segment parameters may be computed by the CPU 102. The per-quadratic Bèzier path segment parameters may be stored for processing at a later time by the same processing engine or a different processing engine.

At step 610 the stroke engine selects a segment and determines if the segment is collinear. If at step 610 the segment is collinear, then at step 618 the stroke engine subdivides the linear segment into "on" dash pattern segments and generates hull geometry for the end caps of each dash pattern element. At step 622, the stroke engine determines if there is another segment in the sequence of segments, and, if so, then step 623 generates the appropriate join style between the just processed and next segment (not generating join style geometry if the dashing state is "off" currently) and returns to step 610. If the path has a MoveTo command between the just processed and next segment, then no join style would be generated by step 623 though the initial dash offset may be reset based on the dash phase. In the case of a ClosePath command between the just processed and next segment, step 623 would generate join style geometry and a line segment closing the subpath to where it started.

If, at step 610 the stroke engine determines that the segment is not collinear, then at step 612 the stroke engine computes the remaining distance of the current dash pattern element. At step 614 the stroke engine subdivides the current quadratic Bèzier segment based on the remaining distance of the current dash pattern element. The arc length of the segment is computed based on Equation 5 and at step 613 the stroke engine determines if the arc length is greater than the remaining distance of the current dash pattern element. When the arc length is not greater than the remaining distance of the current dash pattern element the stroke engine proceeds to step 616 to generate an "on" dash pattern quadratic Bèzier segment and end caps for a current dash pattern element that is on.

If, at step 613, the stroke engine determines that the current quadratic segment's arc length is greater than the remaining distance of the current dash pattern element, then at step 614 a binary search is performed to determine a "t" value that is corresponds to the remaining distance of the current dash pattern in parametric space. Each iteration of the binary search evaluates Equation 5 based on the computation shown in Table 1 to hone a value of "t" that exhausts the current dash element's arc length. In one embodiment de Casteljau's algorithm is used to subdivide the quadratic Bèzier segment at t into two such segments called the current and next segment for the first and second segments resulting from the subdivision. At step 616 the stroke engine processes the current portion of the subdivided quadratic Bèzier segment for the dash pattern element, as described in detail in conjunction with FIG. 6B. At step 620 the stroke engine determines if there is a subdivided next segment still to be processed, and, if so, then the stroke engine proceeds to step 612 treating the next segment as the new current segment; otherwise the stroke engine continues to step 622.

At step 622 the stroke engine determines if the last segment in the sequence of segments in the stroked path has been processed, and, if not, then at step 625 the stroke engine generates the conservative bounding hull geometry for each of the segments (and sub-divided segments) for "on" dash pattern segments including any join style and end cap geometry.

At step 630 the conservative hull geometry for the dashes and any round end caps is rendered using a fragment shader to generate a stencil buffer. More specifically, for quadratic Bèzier segments and round end caps and cusps, a discard shader may be used to write only the locations in the stencil buffer that are within the stroke boundary and within an "on" dash pattern element. For the quadratic Bèzier segments, the applicable technique for stroking a path including quadratic Bèzier segments is described in patent application Ser. No. 13/097,993 filed Apr. 29, 2011, and titled "Point Containment for Quadratic Bèzier Strokes." For round end caps and cusp semi-circles, a discard fragment shader discards fragments beyond a radius from the circle center and otherwise updating the corresponding pixel's stencil value. Geometry for join styles, square and triangular end caps, and stroked line segments is rendered as conventional triangle and/or quadrilateral geometry. The stencil buffer then indicates the pixels within the conservative hull geometry that are also within the "on" dash or round end cap and within the stroke region. The stencil buffer may be used to very efficiently discard unstroked, undashed pixels in the path when rendering the stencil-tested hull geometry with parallel processing subsystem 112. During this rendering, pixel writes to buffers other than the stencil buffer are typically disabled. This approach of updating the coverage of the stroked path in the stencil buffer and then rendering the conservative hull geometry and stencil testing that hull against the path's stroke coverage as indicated by stencil buffer means stroked pixels will be covered just once by the covering process. This guarantees a stroking behavior important to path rendering standards that is relevant if the stroked path is to be blended because blending should be performed once-and-only-once at each pixel contained within the path's stroke. For example in FIG. 5F, the cubic Bèzier segment overlaps itself but this region of dashed overlap should be updated just once.

When the stencil buffer generation is complete for the path, a geometric hull that encloses the entire path is generated and rendered to fill the dashed stroke region by writing the color buffer based on the stencil buffer. During this hull rendering process, the stencil buffer values for pixels passing the stencil test (indicating pixels that are within the path's stroked region) can be reset to their value prior to the generation of the stroked region in the stencil buffer. By restoring the stencil buffer to its prior state before stroking the path, the path rendering process (whether for stroking or filling) can be repeated for successive paths. In another embodiment, the stroke region is filled by writing the color buffer as the conservative bounding hull geometry for each quadratic Bèzier path segment is processed. The hull geometry generated for the line segments and square or triangular end caps, and miter or bevel geometry is also rendered into the color buffer to dash the stroked path. In one embodiment, the per-quadratic Bèzier path segment parameters and bounding hull geometry are processed by a combination of a vertex shader program and a fragment shader program executed by the parallel processing subsystem 112.

Figure 6B:
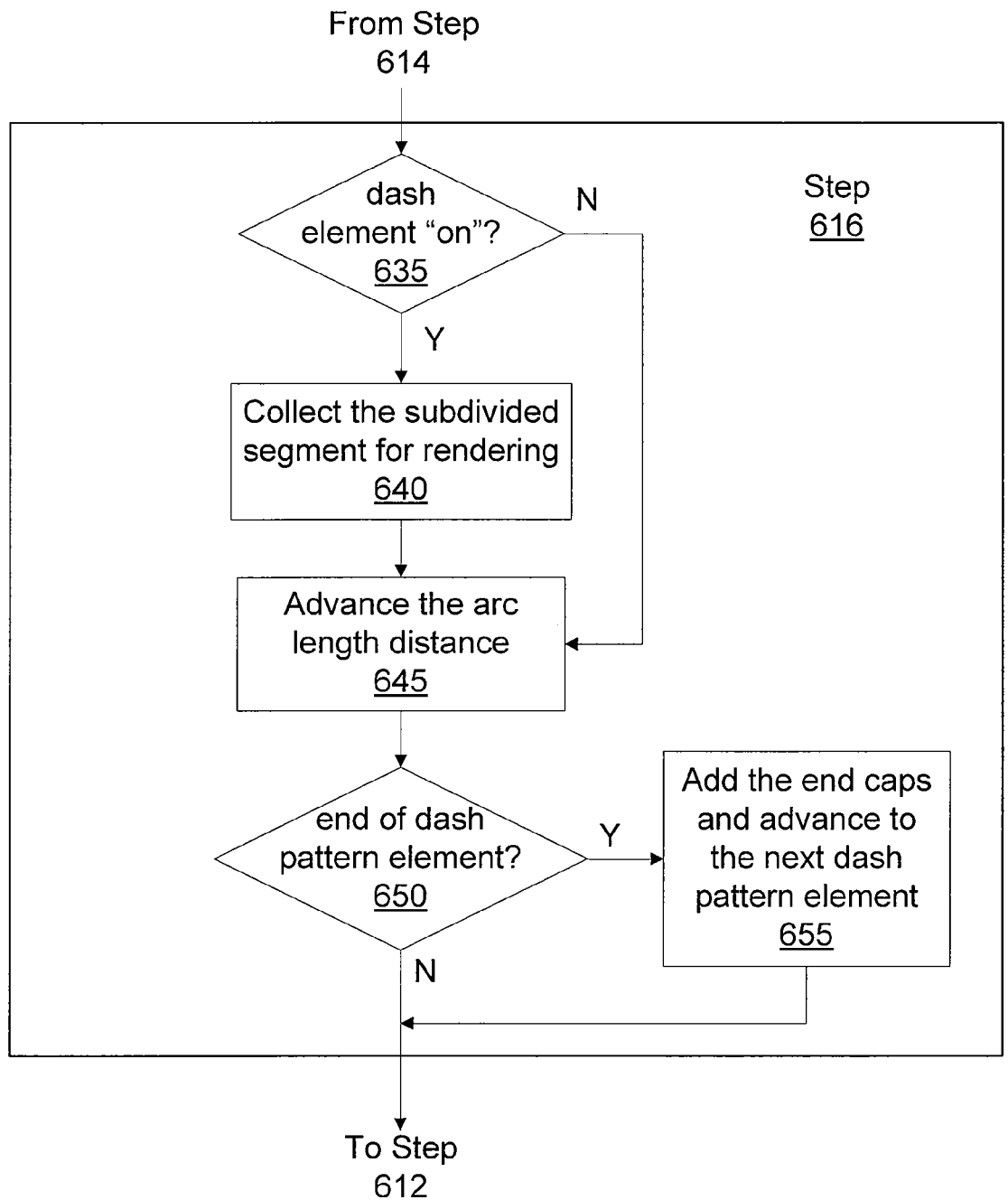
FIG. 6B is a flow diagram of method steps for processing a subdivided quadratic path segment for dash pattern elements as performed in a method step shown in FIG. 6A, according to one embodiment of the present invention.

FIG. 6B is a flow diagram of method steps for processing a quadratic path segment for dash pattern elements as performed in method step 616 shown in FIG. 6A, according to one embodiment of the present invention. At step 635 the stroke engine determines if the current dash pattern element is "on," and if not then the stroke engine proceeds directly to step 645. Otherwise, at step 640 the stroke engine collects the current subdivided segment for rendering, meaning that hull geometry will be generated for the subdivided segment.

At step 645 the arc length distance (in parameter space) corresponding to the remaining distance of the current dash pattern element is advanced along the subdivided quadratic Bèzier segment. At step 650 the stroke engine determines if the end of the current dash pattern element is reached, and, if not, the stroke engine proceeds directly to step 612. Implicit in detecting the end of the dash pattern in step 650 is advancing the dash pattern state. If the end of the dash pattern element is reached, that toggles the on/off dashing Boolean and if the end of the dash pattern is reached, the dash pattern index resets to the first element. Otherwise, at step 655 the stroke engine generates hull geometry for the end caps for the current dash pattern element and advances to the next dash pattern element and then proceeds to step 612.

Performing path stroking with dashing is complex. Therefore, the path is decomposed into quadratic Bèzier segments that are further subdivided as needed based on a dash pattern. An arc length computation is performed for each segment in order to generate bounding hull geometry corresponding to the "on" dashes. Because the geometry set used to produce the dashed stroked path is resolution-independent, the dashed stroked path can be rasterized under arbitrary projective transformations without needing to revisit the construction of the geometry set. This resolution-independent property is unlike geometry sets built through a process of tessellating curved regions into triangles; in such circumstances, sufficient magnification of the filled path would reveal the tessellated underlying nature of such a tessellated geometry set.

The quadratic Bèzier segments are also compact meaning that the number of bytes required to represent the dashed stroked path is linear with the number of path segments in the original path. This property does not generally hold for tessellated versions of stroked paths where the process of subdividing curved edges and introducing tessellated triangles typically increases the size of the resulting geometry set considerably.

The method discussed is further distinguished from prior art in several crucial ways. Prior art decomposes path segments down to linear segments or their equivalents. This makes the prior art's decomposition resolution-dependent in the sense that the curved segments in the path are approximated by polygonal representations. In the prior art, arc length computations are naturally performed on subdivided line segments where Euclidean distance between line segment end-points is identical to the arc length. In contrast, the method described in conjunction with FIGS. 6A and 6B uses a quadratic Bèzier segment arc length computation. Any higher order curved path segments are decomposed to quadratic Bèzier segments, and the quadratic Bèzier segments are stroked and dashed exactly to the limits of numerical precision.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of generating dashed stroked quadratic Bèzier path segments, the method comprising:
    receiving a quadratic Bèzier path segment and a dash pattern;
    determining that a current dash pattern element spans more than one quadratic Bèzier path segment;
    computing a remaining distance for the current dash pattern element of the dash pattern;
    computing an arc length of the quadratic Bèzier path segment; and
    subdividing the quadratic Bèzier path segment based on the remaining distance for the current dash pattern element and the arc length of the quadratic Bèzier path segment to generate "on" dash pattern segments of the quadratic Bèzier path segment.

2. The method of claim 1, wherein computing the arc length comprises converting the arc length into the distance of the quadratic Bèzier path segment in parametric units.

3. The method of claim 2, wherein the step of subdividing comprises subdividing the quadratic Bèzier path segment at the end of the current dash pattern element when the remaining distance is not greater than the distance of the quadratic Bèzier path segment in parametric units.

4. The method of claim 2, further comprising generating geometry for a join between the quadratic Bèzier path segment and a next quadratic Bèzier path segment when the remaining distance is greater than the distance of the quadratic Bèzier path segment in parametric units.

5. The method of claim 1, further comprising generating conservative hull geometry for the "on" dash pattern segments.

6. The method of claim 5, further comprising rendering the conservative hull geometry to generate a stencil buffer indicating pixels that are within a stroke boundary and within the "on" dash pattern segments of the quadratic Bèzier path segment.

7. The method of claim 1, further comprising:
    receiving a second quadratic Bèzier path segment; and
    replacing the second quadratic Bèzier path segment with a line segment when control points of the second quadratic Bèzier path segment are collinear.

8. The method of claim 1, further comprising the steps of:
    receiving a stroke width that defines a stroke region of the quadratic Bèzier path segment; and
    writing pixels that are within the stroke region and within the "on" dash pattern segments to generate a dashed stroked quadratic Bèzier path segment.

9. The method of claim 8, wherein the pixels that are within the stroke region and within the "on" dash pattern segments are indicated by a stencil buffer.

10. The method of claim 1, further comprising generating hull geometry for end caps of the "on" dash pattern segments.

11. A non-transitory computer-readable storage medium storing instructions that, when executed by a processor, cause the processor to generate dashed stroked quadratic Bèzier path segments, by performing the steps of:
    receiving a quadratic Bèzier path segment and a dash pattern;
    determining that a current dash pattern element spans more than one quadratic Bèzier path segment;
    computing a remaining distance for the current dash pattern element of the dash pattern;
    computing an arc length of the quadratic Bèzier path segment; and
    subdividing the quadratic Bèzier path segment based on the remaining distance for the current dash pattern element and the arc length of the quadratic Bèzier path segment to generate "on" dash pattern segments of the quadratic Bèzier path segment.

12. The non-transitory computer-readable storage medium of claim 11, wherein computing the arc length comprises converting the arc length into the distance of the quadratic Bèzier path segment in parametric units.

13. The non-transitory computer-readable storage medium of claim 12, wherein the step of subdividing comprises subdividing the quadratic Bèzier path segment at the end of the current dash pattern element when the remaining distance is not greater than the distance of the quadratic Bèzier path segment in parametric units.

14. The non-transitory computer-readable storage medium of claim 12, further comprising generating geometry for a join between the quadratic Bèzier path segment and a next quadratic Bèzier path segment when the remaining distance is greater than the distance of the quadratic Bèzier path segment in parametric units.

15. The non-transitory computer-readable storage medium of claim 11, further comprising generating conservative hull geometry for the "on" dash pattern segments.

16. The non-transitory computer-readable storage medium of claim 15, further comprising rendering the conservative hull geometry to generate a stencil buffer indicating pixels that are within a stroke boundary and within the "on" dash pattern segments of the quadratic Bèzier path segment.

17. The non-transitory computer-readable storage medium of claim 11, further comprising:
    receiving a second quadratic Bèzier path segment; and
    replacing the second quadratic Bèzier path segment with a line segment when control points of the second quadratic Bèzier path segment are collinear.

18. The non-transitory computer-readable storage medium of claim 11, further comprising the steps of:
    receiving a stroke width that defines a stroke region of the quadratic Bèzier path segment; and
    writing pixels that are within the stroke region and within the "on" dash pattern segments to generate a dashed stroked quadratic Bèzier path segment.

19. The non-transitory computer-readable storage medium of claim 18, wherein the pixels that are within the stroke region and within the "on" dash pattern segments are indicated by a stencil buffer.

20. A system for generated dashed stroked quadratic Bèzier path segments, the system comprising:
    a memory that is configured to store data associated with a quadratic Bèzier path segment; and a processor that is coupled to the memory and configured to:
  receive the quadratic Bèzier path segment and a dash pattern;
  determine that a current dash pattern element spans more than one quadratic Bèzier path segment;
  compute a remaining distance for the current dash pattern element of the dash pattern;
  compute an arc length of the quadratic Bèzier path segment; and
  subdivide the quadratic Bèzier path segment based on the remaining distance for the current dash pattern element and the arc length of the quadratic Bèzier path segment to generate "on" dash pattern segments of the quadratic Bèzier path segment.

* * * * *